US010845521B2

(12) United States Patent
Ueno et al.

(10) Patent No.: US 10,845,521 B2
(45) Date of Patent: Nov. 24, 2020

(54) POLARIZER, ONE-SIDE-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

(71) Applicant: NITTO DENKO CORPORATION, Ibaraki (JP)

(72) Inventors: Tomonori Ueno, Ibaraki (JP); Satoshi Mita, Ibaraki (JP); Jingfan Xu, Ibaraki (JP); Yusuke Motegi, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 189 days.

(21) Appl. No.: 16/079,685

(22) PCT Filed: Jan. 23, 2017

(86) PCT No.: PCT/JP2017/002133
§ 371 (c)(1),
(2) Date: Aug. 24, 2018

(87) PCT Pub. No.: WO2017/145607
PCT Pub. Date: Aug. 31, 2017

(65) Prior Publication Data
US 2019/0049642 A1 Feb. 14, 2019

(30) Foreign Application Priority Data
Feb. 26, 2016 (JP) .................................. 2016-035626

(51) Int. Cl.
*G02B 5/30* (2006.01)
*G02F 1/1335* (2006.01)
(Continued)

(52) U.S. Cl.
CPC .............. *G02B 5/3041* (2013.01); *C09J 7/38* (2018.01); *G02B 5/30* (2013.01); *G02F 1/1335* (2013.01);
(Continued)

(58) Field of Classification Search
CPC .......... G02B 1/08; G02B 5/3033; G02B 1/14; G02F 1/133528
See application file for complete search history.

(56) References Cited

U.S. PATENT DOCUMENTS

2006/0227423 A1 10/2006 Saiki et al.
2008/0128076 A1 6/2008 Nimura
(Continued)

FOREIGN PATENT DOCUMENTS

CN 101162277 A 4/2008
CN 102749668 A 10/2012
(Continued)

OTHER PUBLICATIONS

Office Action dated Jun. 19, 2019, issued in counterpart KR Application No. 10-2018-7023213, with English translatio (13 pages).
(Continued)

*Primary Examiner* — Robert E. Tallman
(74) *Attorney, Agent, or Firm* — Westerman, Hattori, Daniels & Adrian, LLP

(57) ABSTRACT

A polarizer according to the patent invention is configured to contain boric acid and a polyvinyl alcohol-based resin, to have a thickness of 10 μm or less, and to have an optical property satisfying the condition represented by the expression: $P > -(10^{0.929T-42.4}-1) \times 100$ (when $T < 42.3$) or $P \geq 99.9$ (when $T \geq 42.3$), wherein T represents the single-body transmittance and P represents the polarization degree. In addition, a boric acid content (a) measured from one side of the
(Continued)

polarizer, the one side to be provided with the pressure-sensitive adhesive layer, is less than a boric acid content (b) measured from the other side. The polarizer according to the patent invention can reduce defects due to through cracks and nano-slits even when the polarizer has predetermined optical properties and a thickness of 10 μm or less.

18 Claims, 5 Drawing Sheets

(51) Int. Cl.
    *C09J 7/38*   (2018.01)
    *B29D 11/00*  (2006.01)
(52) U.S. Cl.
    CPC .. *G02F 1/133528* (2013.01); *B29D 11/00644* (2013.01); *G02F 2201/50* (2013.01); *G02F 2202/28* (2013.01)

(56) References Cited

U.S. PATENT DOCUMENTS

| | | |
|---|---|---|
| 2011/0043733 A1 | 2/2011 | Suzuki et al. |
| 2011/0163281 A1 | 7/2011 | Bae et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057231 A1 | 3/2012 | Goto et al. |
| 2012/0058291 A1 | 3/2012 | Kitagawa et al. |
| 2012/0058321 A1 | 3/2012 | Goto et al. |
| 2012/0206804 A1 | 8/2012 | Nam et al. |
| 2012/0300299 A1* | 11/2012 | Yasui .................. G02B 1/16 359/483.01 |
| 2016/0363699 A1 | 12/2016 | Kunai |

FOREIGN PATENT DOCUMENTS

| | | |
|---|---|---|
| JP | 2005-43858 A | 2/2005 |
| JP | 2009-205141 A | 9/2009 |
| JP | 2009-230131 A | 10/2009 |
| JP | 2010-9027 A | 1/2010 |
| JP | 4751481 B1 | 8/2011 |
| JP | 2011-227450 A | 11/2011 |
| JP | 2013-68804 A | 4/2013 |
| JP | 5189507 B2 | 4/2013 |
| JP | 2013-160775 A | 8/2013 |
| JP | 5504232 B2 | 5/2014 |
| JP | 2015-129826 A | 7/2015 |
| JP | 2015-161782 A | 9/2015 |
| KR | 10-2006-0009837 A | 2/2006 |
| KR | 10-2011-0078782 A | 7/2011 |
| KR | 10-2012-0099172 A | 9/2012 |
| WO | 2011/125958 A1 | 10/2011 |

OTHER PUBLICATIONS

Office Action dated Nov. 27, 2018, issued in counterpart Japanese Application No. 2018-501062, with English translation (7 pages).
Notification of Transmittal of Translation of the International Preliminary Report on Patentability (Form PCT/IB/338) issued in counterpart International Application No. PCT/JP2017/002133 dated Sep. 7, 2018, with Forms PCT/IB/373 and PCT/ISA/237. (9 pages).
International Search Report dated Apr. 25, 2017, issued in counterpart application No. PCT/JP2017/002133. (2 pages).
Office Action dated Mar. 27, 2020, issued in counterpart CN Application No. 201780013266.1, with English Translation. (15 pages).

* cited by examiner

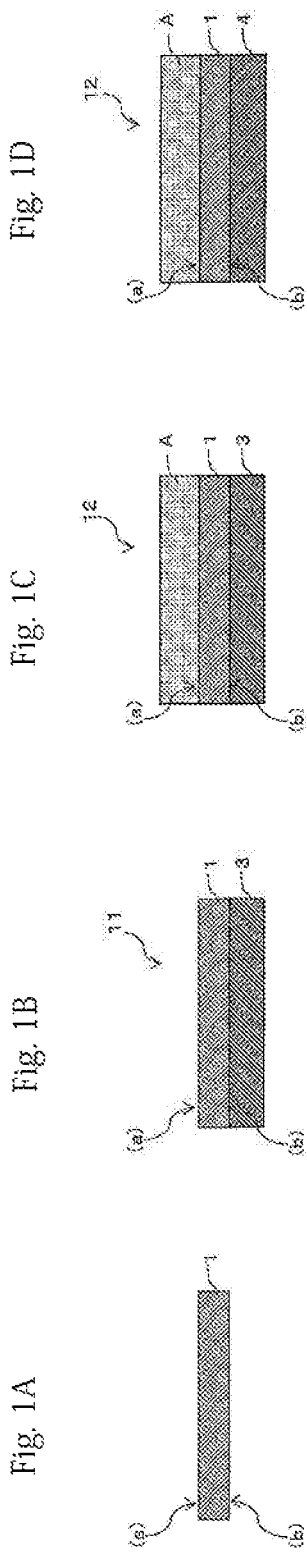

POLARIZER, ONE-SIDE-PROTECTED POLARIZING FILM, PRESSURE-SENSITIVE-ADHESIVE-LAYER-ATTACHED POLARIZING FILM, IMAGE DISPLAY DEVICE, AND METHOD FOR CONTINUOUSLY PRODUCING SAME

TECHNICAL FIELD

The invention relates to a polarizer and a one-side-protected polarizing film. In addition, the invention relates to a pressure-sensitive-adhesive-layer-attached polarizing film including the polarizer or the one-side-protected polarizing film. The polarizer, the one-side-protected polarizing film or the pressure-sensitive-adhesive-layer-attached polarizing film may be used alone or as a component of a multilayer optical film to form an image display device such as a liquid crystal display (LCD) or an organic electroluminescent (EL) display.

BACKGROUND ART

The image forming system of liquid crystal display devices has polarizing films placed as essential components on both sides of glass substrates that form the liquid crystal panel surfaces. A polarizing film generally used includes a polarizer and a transparent protective film or films bonded to one or both surfaces of the polarizer with a polyvinyl alcohol-based adhesive or any other adhesive, in which the polarizer includes a polyvinyl alcohol-based film and a dichroic material such as iodine.

In general, a pressure-sensitive adhesive is used to bond such a polarizing film to a liquid crystal cell or any other component. The pressure-sensitive adhesive is provided as a pressure-sensitive adhesive layer in advance on one surface of the polarizing film because such a pressure-sensitive adhesive layer has advantages such as the ability to instantly fix the polarizing film and no need to perform a drying step for fixing the polarizing film. Thus, a pressure-sensitive-adhesive-layer-attached polarizing film is generally used when a polarizing film is bonded.

Polarizing films and pressure-sensitive-adhesive-layer-attached polarizing films have a problem in that in a harsh environment accompanied by thermal shock (e.g., a heat shock test in which −30° C. and 80° C. temperature conditions are repeated, or a test at a high temperature of 100° C.), the polarizer undergoes changes in shrinkage stress, so that cracks (through cracks) can easily occur entirely in the direction of the absorption axis of the polarizer. In other words, pressure-sensitive-adhesive-layer-attached polarizing films have insufficient durability to thermal shock in the harsh environment mentioned above. For thickness reduction, a pressure-sensitive-adhesive-layer-attached polarizing film can be produced using a one-side-protected polarizing film including a polarizer and a protective film provided on only one surface of the polarizer. Particularly, such a pressure-sensitive-adhesive-layer-attached polarizing film has insufficient durability to the thermal shock mentioned above. In addition, the thermal shock-induced through cracks become more likely to occur as the size of the polarizing film increases.

In order to suppress the occurrence of the through cracks, for example, it is proposed to provide a pressure-sensitive-adhesive-layer-attached polarizing film including a one-side-protected polarizing film, a protective layer provided on the polarizing film and having a tensile elastic modulus of 100 MPa or more, and a pressure-sensitive adhesive layer provided on the protective layer (Patent Document 1). It is also proposed to provide a pressure-sensitive-adhesive-layer-attached polarizing film including a polarizer with a thickness of 25 µm or less, a protective layer provided on one surface of the polarizer and including a product obtained by curing a curable resin composition, a transparent protective film provided on the other surface of the polarizer, and a pressure-sensitive adhesive layer provided on the outer side of the protective layer (Patent Document 2). The pressure-sensitive-adhesive-layer-attached polarizing films described in Patent Documents 1 and 2 are effective in terms of suppressing the occurrence of through cracks. In addition, from the viewpoint of suppressing occurrence of through cracks and providing a thinner layer and a lighter weight, it has been proposed to provide a protective layer made of a water-soluble film-forming composition (polyvinyl alcohol-based resin composition) on at least one side of the polarizer (Patent Document 3). In addition, polarizers have also been reduced in thickness. For example, it is proposed to provide a thin polarizer having controlled optical properties including a controlled single-body transmittance and a controlled degree of polarization and also having high orientation (Patent Document 4).

PRIOR ART DOCUMENTS

Patent Documents

Patent Document 1: JP-A-2010-009027
Patent Document 2: JP-A-2013-160775
Patent Document 3: JP-A-2005-043858
Patent Document 4: JP-B1-4751481

SUMMARY OF THE INVENTION

Problems to be Solved by the Invention

Patent Documents 1 and 2 disclose that a reduction in thickness is achieved by using a one-side-protected polarizing film having a transparent protective film on only one surface of a polarizer, while a protective layer is provided to suppress the occurrence of through cracks in the direction of the absorption axis of the polarizer, which would otherwise be caused by the use of the one-side-protected polarizing film. Further, in Patent Document 3, by providing a protective layer on the polarizer, occurrence of through cracks in the absorption axis direction of the polarizer is suppressed.

On the other hand, polarizers have also been reduced in thickness. When a thinner polarizer (e.g., 10 µm or less in thickness) is used to form a one-side-protected polarizing film or a pressure-sensitive-adhesive-layer-attached polarizing film, changes in shrinkage stress in the polarizer become smaller. Therefore, it has been found that the use of a thinner polarizer makes it possible to suppress the occurrence of through cracks.

However, it has been found that even through the occurrence of through cracks is suppressed in a one-side-protected polarizing film or a pressure-sensitive-adhesive-layer-attached polarizing film produced therewith, extremely-fine partial cracks (hereafter also referred to as nano-slits) can occur in the absorption axis direction of the polarizer when the optical properties are controlled and the polarizer used is thin (e.g., 10 µm or less in thickness) as described in Patent Document 4, and mechanical shock is applied to the one-side-protected polarizing film or the pressure-sensitive-adhesive-layer-attached polarizing film produced therewith (including a case where a load is applied to the polarizer side by downward bending). It has also been found that the nano-slits can occur regardless of the one-side-protected polarizing film size. It has also been found that the nano-slits do not occur when a double-side-protected polarizing film is used, which includes a polarizer and transparent protective films on both surfaces of the polarizer. It has also been found that when a through crack occurs in a polarizer, any other through crack will not occur adjacent to the through crack because the stress around the through crack is released, and that in contrast, not only a nano-slit can occur alone but also nano-slits can occur adjacent to each other. It has also been found that a through crack once formed in a polarizer has the ability to progressively extend in the absorption axis direction of the polarizer, and that in contrast, nano-slits have no ability to progressively extend. Thus, it has been found that the nano-slit is a new problem that occurs when a thin polarizer with optical properties controlled within specific ranges is used to form a one-side-protected polarizing film in which the occurrence of through cracks is suppressed, and that the nano-slit is a problem caused by a phenomenon different from that responsible for the through crack.

In addition, the nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. In other words, nano-slits are difficult to detect by automatic optical inspection, which is generally used for defect inspection of a one-side-protected polarizing film being produced in the form of a long strip. It has also been found that when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

Thus, it is desired to suppress not only the occurrence of through cracks but also the occurrence of nano-slits in a one-side-protected polarizing film having a polarizer with a thickness of 10 or less or in a pressure-sensitive-adhesive-layer-attached polarizing film produced with such a one-side-protected polarizing film.

An object of the present invention is to provide a polarizer to be applied to a pressure-sensitive-adhesive-layer-attached polarizing film, the polarizer less susceptible to defects due to through cracks and nano-slits even if the polarizer has predetermined optical properties and a thickness of 10 μm or less. Another object of the present invention is to provide a one-side-protected polarizing film using the polarizer, and to provide a pressure-sensitive-adhesive-layer-attached polarizing film having the polarizer or the one-side-protected polarizing film and a pressure-sensitive adhesive layer. It is a further object of the present invention to provide an image display device having the polarizer, the one-side-protected polarizing film or the pressure-sensitive-adhesive-layer-attached polarizing film and also to provide a continuous production method thereof.

Means for Solving the Problems

As a result of intensive studies, the inventors have accomplished the invention based on findings that the problems can be solved by the polarizer, and other means described below.

That is, the present invention relates to a polarizer used for a pressure-sensitive-adhesive-layer-attached polarizing film having a pressure-sensitive adhesive layer on one side of the polarizer, which is configured to contain boric acid and a polyvinyl alcohol-based resin, to have a thickness of 10 μm or less, and to have an optical property satisfying a condition represented by an expression: $P>-(10^{0.929T-42.4}-1) \times 100$ (when $T<42.3$) or $P \geq 99.9$ (when $T \geq 42.3$), wherein T represents a single-body transmittance and P represents a polarization degree, and wherein a boric acid content (a) measured from one side of the polarizer, the one side to be provided with the pressure-sensitive adhesive layer, is less than a boric acid content (b) measured from the other side.

In the polarizer, the difference between the boric acid content (a) and the boric acid content (b) is preferably 0.5% by weight or more. Furthermore, the difference is preferably 3% by weight or more.

In the polarizer, the boric acid content (b) is preferably 20% by weight or less.

In the polarizer, a transparent resin layer (formed product) formed of a forming material containing a polyvinyl alcohol-based resin can be provided on one side of the pressure-sensitive adhesive layer side of the polarizer. In the polarizer, a pressure-sensitive adhesive layer is provided with a transparent resin layer interposed.

In the polarizer, the transparent resin layer preferably has a thickness of 0.2 μm or more. In addition, the transparent resin layer preferably has a thickness of 6 μm or less.

In the polarizer, the polyvinyl alcohol-based resin forming the transparent resin layer preferably has a saponification degree of 99 mol % or more and an average polymerization degree of 2000 or more.

Further, the present invention relates to a one-side-protected polarizing film comprising the polarizer and a protective film only on the other side of the polarizer opposite to the side to be provided with the pressure-sensitive adhesive layer.

Further, the present invention relates to a method for producing a polarizer having a transparent resin layer which is a formed product of a forming material containing a polyvinyl alcohol-based resin on one side of the polarizer, the one side to be provided with the pressure-sensitive adhesive layer, wherein the polarizer is configured to contain boric acid and a polyvinyl alcohol-based resin, to have a thickness of 10 μm or less, and to have an optical property satisfying the condition represented by the expression: $P>-(10^{0.929T-42.4}-1) \times 100$ (when $T<42.3$) or $P \geq 99.9$ (when $T \geq 42.3$), wherein T represents the single-body transmittance and P represents the polarization degree, and the boric acid content (a) measured from the one side of the polarizer to be provided with the pressure-sensitive adhesive layer is less than the boric acid content (b) measured from the other side, and the transparent resin layer is provided by applying the transparent resin layer forming material directly on the one side of the polarizer to be provided with the pressure-sensitive adhesive layer.

Further, the present invention relates to a method for producing the one-side-protected polarizing film, having a transparent resin layer which is a formed product of a forming material containing a polyvinyl alcohol-based resin, on one side of the polarizer, the one side to be provided with the pressure-sensitive adhesive layer, wherein the polarizer is configured to contain boric acid and a polyvinyl alcohol-based resin, to have a thickness of 10 μm or less, and to have an optical property satisfying the condition represented by the expression: $P>-(10^{0.929T-42.4}-1) \times 100$ (when $T<42.3$) or $P \geq 99.9$ (when $T \geq 42.3$) wherein T represents the single-body transmittance and P represents the polarization degree, and wherein the boric acid content (a) measured from the one side of the polarizer to be provided with the pressure-sensitive adhesive layer is less than the boric acid content (b) measured from the other side, and the transparent resin layer is provided by applying the transparent resin layer forming material directly on the one side of the polarizer to be provided with the pressure-sensitive adhesive layer.

Further, the present invention relates to a pressure-sensitive-adhesive-layer-attached polarizing film having the polarizer or the one-side-protected polarizing film, and a pressure-sensitive adhesive layer on one side of the polarizer or of the one-side-protected polarizing film, the one side to be provided with a pressure-sensitive adhesive layer.

In the pressure-sensitive-adhesive-layer-attached polarizing film, a separator can be laminated on the pressure-sensitive adhesive layer. The pressure-sensitive-adhesive-layer-attached polarizing film provided with the separator can be used as a roll.

Further, the present invention relates to an image display device comprising the polarizer, the one-side-protected polarizing film or the pressure-sensitive-adhesive-layer-attached polarizing film.

Further, the present invention relates to a method for continuously producing an image display device, the method comprising the steps of:
unwinding the pressure-sensitive-adhesive-layer-attached polarizing film from the roll of the pressure-sensitive-adhesive-layer-attached polarizing film;
feeding the pressure-sensitive-adhesive-layer-attached polarizing film with the separator; and
continuously bonding the pressure-sensitive-adhesive-layer-attached polarizing film to a surface of an image display panel with the pressure-sensitive adhesive layer interposed therebetween.

The polarizer of the present invention has a thickness of 10 μm or less and is thin. The thin polarizer with a thickness of 10 μm or less resists the occurrence of through cracks because changes in the shrinkage stress applied to the polarizer by thermal shock are smaller in the thin polarizer than in thick polarizers.

On the other hand, nano-slits are more likely to occur in thin polarizers having specific optical properties. Nano-slits seem to occur when mechanical shock is applied to the one-side-protected polarizing film or the pressure-sensitive-adhesive-layer-attached polarizing film produced therewith, in the process of producing the one-side-protected polarizing film, in the process of producing the pressure-sensitive-adhesive-layer-attached polarizing film by forming a pressure-sensitive adhesive layer on the one-side-protected polarizing film, or various processes after the production of the pressure-sensitive-adhesive-layer-attached polarizing film. Nano-slits are assumed to be caused by a mechanism different from that responsible for through cracks caused by thermal shock. In addition, when one-side-protected polarizing films or pressure-sensitive-adhesive-layer-attached polarizing films are bonded to the glass substrates or other components of an image display panel and then placed in a heated environment, nano-slits can expand in the widthwise direction, so that nano-slit-induced defects can be detected (e.g., as the presence or absence of light leakage).

The polarizer of the present invention contains boric acid and a polyvinyl alcohol-based resin. Preparation of a general polarizer is carried out, for example, by subjecting a polyvinyl alcohol resin (film) to a stretching step and a cross-linking step with boric acid, so that the boric acid content in the obtained polarizer is in a state of uniformity to some extent. On the other hand, the polarizer of the present invention is so formed that the boric acid content is controlled to have a concentration gradient in the polarizer in such a manner that the boric acid content (a) measured from one side of the polarizer to be provided with the pressure-sensitive adhesive layer is lower than the boric acid content (b) measured from the other side. By using a polarizer having a boric acid concentration gradient in the thickness direction as described above for the pressure-sensitive-adhesive-layer-attached polarizing film, the occurrence of the nano-slits can be suppressed. For example, even when the polarizer becomes convex at the time of attaching the pressure-sensitive-adhesive-layer-attached polarizing film to a liquid crystal panel, it is possible to reduce the damage of the polarizer on the pressure-sensitive adhesive layer side and suppress the occurrence of nano-slits.

The nano-slits, which are extremely fine, cannot be detected in a normal environment. Therefore, even if nano-slits occur in a polarizer, light leakage defects in the one-side-protected polarizing film or the pressure-sensitive-adhesive-layer-attached polarizing film produced therewith are difficult to find by only a glance. It has also been found that when the one-side-protected polarizing film or the pressure-sensitive-adhesive-layer-attached polarizing film is placed in a heated environment, nano-slits can expand in the widthwise direction, so that nano-slit-induced defects can be detected (e.g., as the presence or absence of light leakage). According to the transparent resin layer, even if the nano-slit occurs in the polarizer in the state of the one-side-protected polarizing film before provision of the transparent resin layer, it is possible to suppress the occurrence of defects due to such spreading of the nano-slit in the widthwise direction.

BRIEF DESCRIPTION OF THE DRAWINGS

FIGS. 1A to 1D are schematic cross-sectional views of an example of the polarizer of the invention and the like.

FIGS. 2A to 2D are schematic cross-sectional views of an example of the polarizer of the invention and the like.

MODE FOR CARRYING OUT THE INVENTION

Figure 2A:
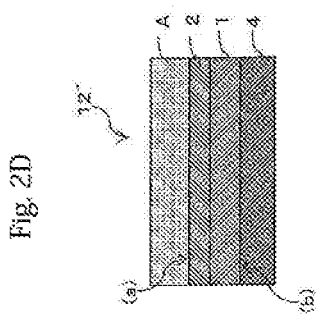

Hereinafter, the polarizer, the one-side-protected polarizing film, and the pressure-sensitive-adhesive-layer-attached polarizing film of the present invention will be described with reference to FIGS. 1A to 2D. A polarizer 1 in FIG. 1A is used as a pressure-sensitive-adhesive-layer-attached polarizing film having a pressure-sensitive adhesive layer A as shown in FIGS. 1C and 1D, and is designed such that the boric acid content (a) measured from one side (a) of the pressure-sensitive adhesive layer side of the polarizer 1 on is lower than the boric acid content (b) measured from the other side (b). FIG. 2A discloses a transparent resin layer-attached polarizer 10 having (directly) a transparent resin layer 2 on one side of the polarizer 1. In the transparent resin layer-attached polarizer 10, the surface of the transparent resin layer 2 becomes one side (a) on the pressure-sensitive adhesive layer side of the polarizer 1, and the boric acid content (a) is measured from the one side (a). As shown in FIGS. 2C and 2D, in transparent resin layer-attached polarizer 10, a pressure-sensitive adhesive layer A is provided on the transparent resin layer 2 side of the polarizer 1.

Figure 2B:
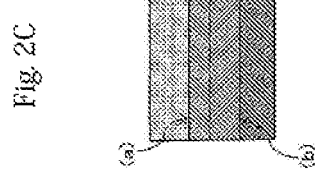
Figure 2C:
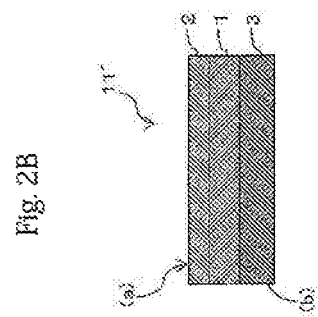
Figure 2D:
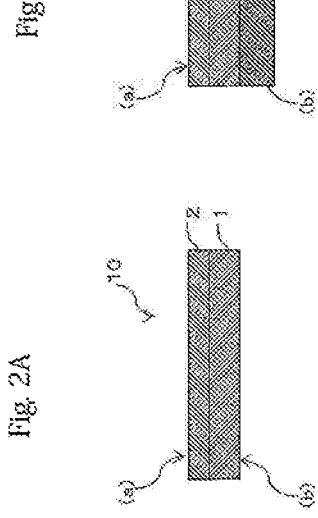

Further, as shown in FIGS. 1B and 2B, a resin substrate 3 may be provided on the other side (b) of the polarizer 1 in the polarizer 1 shown in FIG. 1A and the transparent resin layer-attached polarizer 10 shown in FIG. 2A. As the resin substrate 3, for example, a resin substrate used for producing a thin type polarizer 1 can be mentioned. The resin substrate can also be used as a protective film.

FIGS. 1C and 2C show the pressure-sensitive-adhesive-layer-attached polarizing films 12 and 12' having the pressure-sensitive adhesive layer A provided on one side (a) of the polarizer 1 in FIG. 1B or the transparent resin layer-attached polarizer 10 in FIG. 2B. FIGS. 1D and 2D each shows a case where a protective film 4 is provided in place of the resin substrate 3 in FIGS. 1C and 2C. In FIGS. 1C, 2C, 1D, and 2D, the pressure-sensitive-adhesive-layer-attached polarizing films 12 and 12' are each a pressure-sensitive-adhesive-layer-attached one-side-protected polarizing film having the protective film 4 only on one side of the polarizer.

The protective film 4 can be provided only on the other side (b) of the polarizer 1. Two or more protective films 4 can also be laminated and used. Although not shown in FIGS. 1D and 2D, the polarizer 1 and the protective film 4 are laminated with an intervening layer such as an adhesive layer, a pressure-sensitive adhesive layer, and an undercoat layer (primer layer) interposed therebetween. Although not shown, by providing an easy adhesion layer or activating treatment on the protective film 4, the easy adhesion layer and the adhesive layer can be laminated.

Although not shown, a separator can be provided in the pressure-sensitive-adhesive layer A of FIGS. 1A to 2D. In addition, a surface protective film can be provided on the resin substrate 3 and the protective film 4 in FIGS. 1A to 2D. The pressure-sensitive-adhesive-layer-attached polarizing film having at least a separator (further having a surface protective film) can be used as a roll. For example, a method in which the pressure-sensitive-adhesive-layer-attached polarizing film that is fed out from a roll and is conveyed by a separator is bonded to the surface of an image display panel by means of a pressure-sensitive adhesive layer is employed (this method is also referred to as "roll-to-panel method"). It is possible to continuously produce an image display device typically according to Japanese Patent No. 4,406,043.

The polarizer 1 or the transparent resin layer-attached polarizer 10 according to the present invention is designed such that the boric acid content (a) measured from the one side (a) on the pressure-sensitive adhesive layer side is lower than the boric acid content (b) measured from the other side (b). The difference (b)-(a) between the boric acid content (a: percent by weight) and the boric acid content (b: percent by weight) is preferably 0.5% by weight or more, more preferably 3% by weight or more. As the difference (b)-(a) becomes larger, the boric acid content (a) becomes smaller than the boric acid content (b), which is preferable from the viewpoint of suppressing the formation of nano-slits, etc. when bonding the pressure-sensitive-adhesive-layer-attached polarizing film to a liquid crystal panel.

As described above, in order to design the boric acid content (a) measured from one side on the pressure-sensitive adhesive layer side of the polarizer 1 shown in FIG. 1A to be lower than the boric acid content (b) measured from the other side (b), for example, such designing can be achieved by producing the polarizer 1 on the resin substrate 3 by a production method described below and then subjecting it to a water washing step. By bringing water into contact with only one side (a) of the polarizer 1 formed on the resin substrate 3 so that boric acid is removed from only the surface which is to be one side (a) in the obtained polarizer, the boric acid content can be designed to be lower than that on the surface (surface to be brought into contact with the resin substrate 3) which is to be one side (b) in the polarizer.

Further, as shown in FIG. 2A, by forming the transparent resin layer 2 with a forming material containing a polyvinyl alcohol-based resin on one side of the polarizer 1, it is possible to design the transparent resin layer-attached polarizer 10 such that the boric acid content (a) measured from the one side (a) of the transparent resin layer-attached polarizer 10 can be lower than the boric acid content (b) of the other side (b). The boric acid content in the polarizer 1 can be adjusted so that the difference between the boric acid content (a) measured from one side (a) of the transparent resin layer-attached polarizer 10 and the boric acid content (b) becomes large, resulting in more effectively suppressing the formation of nano-slits. Providing the transparent resin layer 2 is preferable for designing the difference (b)-(a) between the boric acid content (a) and the boric acid content (b) to be 3% by weight or more. It is considered that when the transparent resin layer 2 is provided, a part of the material forming the transparent resin layer 2 penetrates into the polarizer 1, and the boric acid component near the surface of the polarizer 1 moves toward the transparent resin layer 2 side, so that the proportion of boric acid in the vicinity of the surface of the polarizer 1 decreases and the boric acid content (a) can be designed to be lower than the boric acid content (b) on one side.

The boric acid content (a) measured from one side (a) and the boric acid content (b) measured from the other side (b) in the polarizer or the transparent resin layer-attached polarizer can be measured by the method described in Examples.

Figure 3A:
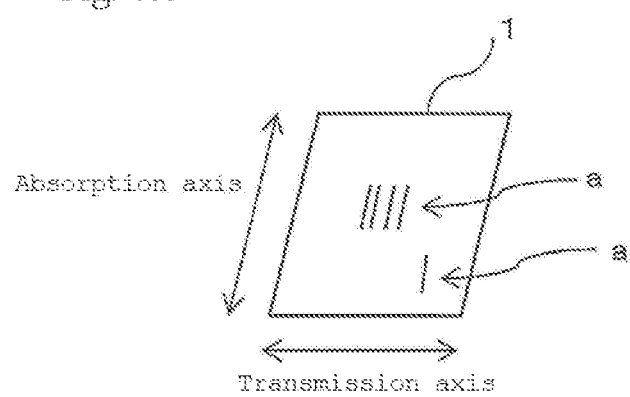
FIGS. 3A and 3B are exemplary schematic diagrams for a comparison between a nano-slit and a through crack occurring in a polarizer.
Figure 3B:
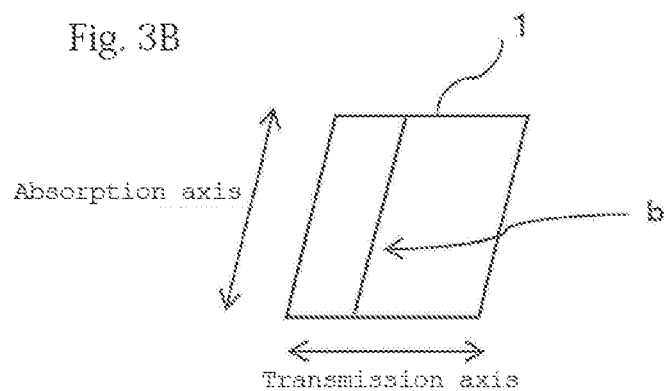

FIGS. 3A and 3B are schematic diagrams for comparing a nano-slit a and a through crack b, which can occur in the polarizer. FIG. 3A shows nano-slits a occurring in the polarizer 1, and FIG. 3B shows a through crack b occurring in the polarizer 1. The nano-slits a are caused by mechanical shock and partially occur in the direction of the absorption axis of the polarizer 1. The nano-slits a cannot be observed at the beginning of their formation, but become observable as they expand in the widthwise direction in a hot environment (e.g., at 80° C. or 60° C. and 90% RH). On the other hand, the nano-slits a are not considered to have the ability to progressively extend in the direction of the absorption axis of the polarizer. In addition, the nano-slits a are considered to occur regardless of the size of the one-side-protected polarizing film. Not only a single nano-slit a can occur alone, but also nano-slits a can occur adjacent to one another. On the other hand, the through crack b is caused by thermal shock (e.g., in a heat shock test). The through crack has the ability to progressively extend in the direction of the absorption axis of the polarizer, where the crack occurs. When a through crack b occurs, any other through crack will not occur adjacent thereto because the stress around it is released.

<Polarizer>

In the invention, the polarizer used has a thickness of 10 μm or less. In order to reduce the thickness and suppress the occurrence of through cracks, the thickness of the polarizer is preferably 8 μm or less, more preferably 7 μm or less, even more preferably 6 μm or less. On the other hand, the thickness of the polarizer is preferably 2 μm or more, more preferably 3 μm or more. The polarizer with such a small thickness is less uneven in thickness, has good visibility, and is less dimensionally-variable and thus has high durability to thermal shock.

Any of various types of polarizers may be used. The polarizer used includes a polyvinyl alcohol-based resin. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride. Among these polarizers, a polarizer including a polyvinyl alcohol-based film and a dichroic material such as iodine is preferred.

For example, a polarizer including a uniaxially-stretched polyvinyl alcohol-based film dyed with iodine can be produced by a process including immersing a polyvinyl alcohol-based film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

In view of stretching stability and optical durability, the polarizer preferably contains boric acid. From the viewpoint of suppressing occurrence of cracks such as through cracks, the boric acid content (b) in the polarizer is preferably 20% by weight or less, more preferably 18% by weight or less, even more preferably 16% by weight or less. If the boric acid content (b) in the polarizer is more than 20% by weight, shrinkage stress in the polarizer increases to make through cracks more likely to occur even when the thickness of the polarizer is controlled to 10 μm or less, which is not preferred. On the other hand, in view of the stretching stability and optical durability of the polarizer, the boric acid content (b) is preferably 10% by weight or more, more preferably 12% by weight or more, based on the total weight of the polarizer. The boric acid content (b) is preferably 10 to 20% by weight, more preferably 12 to 18% by weight.

The boric acid content (a) measured from one side (a) of the pressure-sensitive adhesive layer side of the polarizer 1 shown in FIGS. 1A to 1D is preferably 9.5% by weight or more to less than 20% by weight, more preferably 12 to 19.5% by weight, even more preferably 14 to 18% by weight, still even more preferably 16 to 18% by weight. With respect to the boric acid content (a) and the boric acid content (b), it is preferable to design the boric acid content (a) to be lower than the boric acid content (b).

Typical examples of the thin polarizer having thickness of 15 μm or less include the thin polarizers described in, for example, JP-B1-4751486, JP-B1-4751481, JP-B1-4815544, JP-B1-5048120, JP-B1-5587517, WO 2014/077599 A, and WO 2014/077636 A or thin polarizers obtained by the production methods described in these publications.

The polarizer is preferably designed to have a single-body transmittance T and a polarization degree P that represent optical properties satisfying the condition of the following formula: $P>-(10^{0.929T-42.4}-1)\times100$ (provided that $T<42.3$) or $P\geq99.9$ (provided that $T\geq42.3$). The polarizer designed to satisfy the condition uniquely has the performance required for a liquid crystal television display having a large display element. Specifically, such a display is required to have a contrast ratio of 1,000:1 or more and a maximum brightness of 500 cd/m$^2$ or more. In other applications, for example, the polarizer is bonded to the viewer side of an organic EL display device.

The thin polarizer described above should be produced by a process capable of achieving high-ratio stretching to improve polarizing performance, among processes including the steps of stretching and dyeing a laminate. From this point of view, the thin polarizer is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

<Resin Substrate>

The resin substrates used in the production of the thin polarizer can be used for the resin substrates shown in FIGS. 1A to 2D (resin substrate for stretching). Various thermoplastic resins can be used as the forming material for the resin substrate. Examples of the thermoplastic resin include ester-based resins such as polyethylene terephthalate-based resins, cycloolefin-based resins such as norbornene-based resins, olefin-based resins such as polypropylene, polyamide LEO resins, polycarbonate-based resins, and copolymerized resins thereof. Among them, ester-based resins are preferred in view of ease of production and reduction in costs. As the ester-based thermoplastic resin substrate, there can be used a thermoplastic amorphous ester-based resin substrate or a thermoplastic crystalline ester-based resin substrate.

<Transparent Resin Layer>

The transparent resin layer is formed of a forming material including a polyvinyl alcohol-based resin. The polyvinyl alcohol-based resin used to form the transparent resin layer may be the same as or different from the polyvinyl alcohol-based resin in the polarizer as long as it falls under the category of "polyvinyl alcohol-based resin".

The transparent resin layer can be formed, for example, by applying the forming material to the polarizer. The transparent resin layer is a coating layer formed by applying the forming material, and unlike a stretched polyvinyl alcohol-based resin layer forming a polarizer, it is a non-stretched layer. In the one-side-protected polarizing film having the protective film provided on only one side of the polarizer, the transparent resin layer is provided on the other surface of the polarizer (the surface not having the protective film). In some cases, after the one-side-protected polarizing film is bonded to an image display panel, mechanical shock is so applied as to bend the polarizer in a convex shape toward the image display panel side during handling. At this time, the stress concentrating on the top of the convex side (one side of the polarizer to be provided with the pressure-sensitive adhesive layer) of the polarizer can cause the polarizer to crack, resulting in the formation of nano-slits. When formed from a forming material including a polyvinyl alcohol-based resin, the transparent resin layer is formed, for example, on the convex side (one side to be provided with the pressure-sensitive adhesive layer) of the polarizer. The transparent resin layer including polyvinyl alcohol with a low boric acid content is less likely to be damaged by stress or bending. Even if stress concentrates on the convex portion of the polarizer, the transparent resin layer formed can relax the stress and thus suppress the occurrence of nano-slits in the polarizer. When a polyvinyl alcohol-based resin is used as the transparent resin layer, boric acid contained in the polarizer partly leaks into the transparent resin layer during the process of forming the transparent resin layer, whereby the content of boric acid in the polarizer is reduced to enable the polarizer itself to resist the occurrence of nano-slits. The transparent resin layer can also suppress the occurrence of expansion of nano-slits in the widthwise direction when the polarizing film is placed in a heated environment. Nano-slits formed in the polarizer by mechanical shock tend to expand in the widthwise direction in a heated environment. However, the transparent resin layer formed of the forming material including the polyvinyl alcohol-based resin can maintain the mechanical holding ability of the transparent resin layer even in a hot environment and thus can suppress the expansion of the nano-slits in the widthwise direction.

Note that the boric acid content (a) measured from one side (a) of the pressure-sensitive adhesive layer side (transparent resin layer side) of the pressure-sensitive-adhesive-layer-attached polarizing film 10 shown in FIGS. 2A to 2D is preferably 0 or more to less than 20% by weight, more preferably 2 to 19.5% by weight, even more preferably 3 to 16% by weight, still even more preferably 4 to 10% by weight. With respect to the boric acid content (a) and the boric acid content (b), it is preferable to design the boric acid content (a) to be lower than the boric acid content (b).

The thickness of the transparent resin layer is preferably 0.2 μm or more. With the transparent resin layer having such a thickness, it is possible to suppress the occurrence of nano-slits. The thickness of the transparent resin layer is preferably 0.5 μm or more, more preferably 0.7 μm or more. On the other hand, when the transparent resin layer becomes too thick, the optical reliability and water resistance are lowered. Therefore, the thickness of the transparent resin layer is generally preferably 6 μm or less, more preferably 5 μm or less, even more preferably 3 μm or less.

The polyvinyl alcohol-based resin may be, for example, polyvinyl alcohol. Polyvinyl alcohol can be obtained by saponifying polyvinyl acetate. The polyvinyl alcohol-based resin may also be a product produced by saponifying a copolymer of vinyl acetate and a monomer copolymerizable therewith. When the copolymerizable monomer is ethylene, an ethylene-vinyl alcohol copolymer can be obtained. Examples of the copolymerizable monomer include unsaturated carboxylic acids such as maleic acid (anhydride), fumaric acid, crotonic acid, itaconic acid, and (meth)acrylic acid, and esters thereof; α-olefins such as ethylene and propylene; (sodium) (meth)allylsulfonate, sodium sulfonate (monoalkyl maleate), sodium disulfonate alkyl maleate, N-methylolacrylamide, acrylamide alkyl sulfonate alkali salts, N-vinylpyrrolidone, and N-vinylpyrrolidone derivatives. These polyvinyl alcohol-based resins may be used singly or in combination of two or more thereof. From the viewpoint of satisfying moisture heat resistance and water resistance, polyvinyl alcohol obtained by saponifying polyvinyl acetate is preferable.

The polyvinyl alcohol-based resin can have a saponification degree of, for example, 95% by mole or more. In view of satisfying moisture heat resistance and water resistance, the polyvinyl alcohol-based resin preferably has a saponification degree of 99% by mole or more, more preferably 99.7% by mole or more. The saponification degree indicates the proportion of the units actually saponified to vinyl alcohol units in the units capable of being converted to vinyl alcohol units by saponification, and the residues are vinyl ester units. The saponification degree can be determined according to JIS K 6726-1994.

The average polymerization degree of the polyvinyl alcohol-based resin to be used may be, for example, 500 or more. However, from the viewpoint of satisfying moist heat resistance and water resistance, the polyvinyl alcohol-based resin preferably has an average polymerization degree of 1,000 or more, more preferably 1,500 or more, even more preferably 2,000 or more. The average polymerization degree of the polyvinyl alcohol-based resin is measured according to JIS-K 6726.

The polyvinyl alcohol-based resin to be used may also be a modified polyvinyl alcohol-based resin having a hydrophilic functional group on the side chain of the polyvinyl alcohol or copolymerized polyvinyl alcohol. The hydrophilic functional group may be, for example, an acetoacetyl group, a carbonyl group, and the like. In addition, a modified polyvinyl alcohol obtained by acetalization, urethanization, etherification, grafting, phosphoric esterification, or the like of a polyvinyl alcohol-based resin can be used.

The transparent resin layer of the present invention is formed from a forming material containing the polyvinyl alcohol-based resin as a main component, and the forming material may contain a curable component (crosslinking agent) or the like. The content of the polyvinyl alcohol-based resin in the transparent resin layer or the forming material (solid content) is preferably 80% by weight or more, more preferably 90% by weight or more, even more preferably 95% by weight or more. However, the forming material is preferably free of any curable component (crosslinking agent).

As the crosslinking agent, a compound having at least two functional groups reactive with the polyvinyl alcohol-based resin can be used. Examples of such a compound include alkylenediamines having an alkylene group and two amino groups, such as ethylenediamine, triethylenediamine, and hexamethylenediamine; isocyanates such as tolylene diisocyanate, hydrogenated tolylene diisocyanate, trimethylolpropane tolylene diisocyanate adducts, triphenylmethane triisocyanate, methylene bis(4-phenylmethane triisocyanate, isophorone diisocyanate, and ketoxime blocked compounds thereof or phenol blocked compounds thereof; epoxies such as ethylene glycol diglycidyl ether, polyethylene glycol diglycidyl ether, glycerin di- or tri-glycidyl ether, 1,6-hexanediol diglycidyl ether, trimethylolpropane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; amino-formaldehyde resins such as condensates of formaldehyde with methylolurea, methylolmelamine, alkylated methylolurea, alkylated methylolmelamine, acetoguanamine, or benzoguanamine; dicarboxylic acid dihydrazides such as adipic acid dihydrazide, oxalic acid dihydrazide, malonic acid dihydrazide, succinic acid dihydrazide, glutaric acid dihydrazide, isophthalic acid dihydrazide, sebacic acid dihydrazide, maleic acid dihydrazide, fumaric acid dihydrazide, and itaconic acid dihydrazide; and water-soluble dihydrazines such as ethylene-1,2-dihydrazine, propylene-1,3-dihydrazine, and butylene-1,4-dihydrazine. Of these, amino-formaldehyde resins and water-soluble dihydrazines are preferred. The amino-formaldehyde resin is preferably a compound having a methylol group. Methylolmelamine is particularly suitable among the methylol group-containing compounds.

The curable component (crosslinking agent) can be used from the viewpoint of improving water resistance, and the content of the curable component is preferably 20 parts by weight or less, 10 parts by weight or less, or 5 parts by weight or less, per 100 parts by weight of the polyvinyl alcohol-based resin.

The transparent resin layer of the present invention may contain boric acid in addition to the polyvinyl alcohol-based resin. By containing boric acid in the transparent resin layer, it is possible to control the proportion of boric acid permeating into the transparent resin layer from the polarizer, so that the boric acid content (a) measured from one side (a) of the transparent resin layer-attached polarizing film is controlled within a desired range. The proportion of the boric acid is preferably 20 parts by weight or less, more preferably 15 parts by weight or less, even more preferably 10 parts by weight or less, with respect to 100 parts by weight of the polyvinyl alcohol-based resin.

The forming material is prepared as a solution obtained by dissolving the polyvinyl alcohol-based resin in a solvent. Examples of the solvent include water, dimethyl sulfoxide, dimethylformamide, dimethylacetamide, N-methylpyrrolidone, various glycols, polyhydric alcohols such as trimethylolpropane, and amines such as ethylenediamine and diethylenetriamine. These solvents can be used singly or in combination of two or more thereof. Among them, an aqueous solution using water as the solvent is preferably used to form the forming material. The concentration of the polyvinyl alcohol-based resin in the forming material (e.g., an aqueous solution) is, but not particularly limited to, 0.1 to 15% by weight, preferably 0.5 to 10% by weight, in view of coatability and storage stability.

Additives may be appropriately added to the forming material (for example, aqueous solution). Examples of the additives include plasticizers, surfactants and the like. Examples of the plasticizer include polyhydric alcohols such as ethylene glycol and glycerin. As the surfactant, for example, a nonionic surfactant can be mentioned. Further, coupling agents such as silane coupling agents and titanium coupling agents, various tackifiers, ultraviolet absorbers, antioxidants, stabilizers such as heat stabilizers and hydrolysis stabilizers, and the like may be added.

The transparent resin layer can be formed by applying the forming material on one side (a: side to be provided with a pressure-sensitive adhesive layer) of the polarizer, followed by drying. The forming material is preferably applied in such a manner that the thickness after drying is 0.2 µm or more. The application process is not particularly limited, and any appropriate method may be used in the application process. For example, various means such as a roll coating method, a spin coating method, a wire bar coating method, a dip coating method, a die coating method, a curtain coating method, a spray coating method, and a knife coating method (a comma coating method, etc.) may be used. In general, the drying temperature is preferably from 60 to 120° C., more preferably from 70 to 100° C. The drying time is preferably from 10 to 300 seconds, more preferably from 20 to 120 seconds.

<Protective Film>

The protective film is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acryl-based polymers such as polymethyl methacrylate, styrene-based polymers such as polystyrene and acrylonitrile-styrene copolymers (AS resins), and polycarbonate-based polymers. Examples of polymers that may be used to form the protective film also include polyolefin-based polymers such as polyethylene, polypropylene, cyclo-based or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the protective film is preferably from 50 to 100% by weight, more preferably from 50 to 99% by weight, even more preferably from 60 to 98% by weight, further more preferably from 70 to 97% by weight. If the content of the thermoplastic resin in the protective film is 50% by weight or less, high transparency and other properties inherent in the thermoplastic resin may fail to be sufficiently exhibited.

The protective film may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the protective film may be selected as needed. In general, the thickness of the transparent protective film is from about 1 to about 500 µm in view of strength, workability such as handleability, and thin layer formability. In particular, the thickness of the transparent protective film is preferably from 1 to 300 µm, more preferably from 5 to 200 µm, even more preferably from 5 to 150 µm, further more preferably from 20 to 100 µm for thickness reduction.

The surface of the protective film, opposite to its surface where the polarizer is bonded, may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the protective film itself or as a layer independent of the protective film.

<Intervening Layer>

The protective film and the polarizer are laminated with an intervening layer, such as an adhesive layer, a pressure-sensitive adhesive layer, or an undercoat layer (primer layer), between them. In this case, the intervening layer should preferably be used to laminate them with no air gap between them.

The adhesive layer is made from an adhesive. Any of various types of adhesives may be used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, a gelatin-based adhesive, a vinyl-based adhesive, a latex-based adhesive, or a water-based polyester adhesive. The water-based adhesive is generally used in the form of an aqueous solution, which generally has a solids content of 0.5 to 60% by weight.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

For example, when the water-based adhesive is used, the adhesive is preferably applied in such a manner that the finally formed adhesive layer can have a thickness of 30 to 300 nm. The adhesive layer more preferably has a thickness of 60 to 250 nm. On the other hand, when the active energy ray-curable adhesive is used, the adhesive layer is preferably formed with a thickness of 0.1 to 200 µm. The thickness is more preferably from 0.5 to 50 µm, even more preferably from 0.5 to 10 µm.

In the process of laminating the polarizer and the protective film, an adhesion-facilitating layer may be placed between the protective film and the adhesive layer. The adhesion-facilitating layer may be made of, for example, any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

The adhesion-facilitating layer is usually provided in advance on the protective film, and then the adhesion-facilitating layer side of the protective film is bonded to the polarizer with the adhesive layer. The adhesion-facilitating layer can be formed using a known technique that includes applying an adhesion-facilitating-layer-forming material onto the protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 µm, more preferably 0.02 to 2 µm, even more preferably 0.05 to 1 µm. Two or more adhesion-facilitating layers may be provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer and the protective film. The primer layer may be made of any material capable of providing somewhat strong adhesion to both the base film and a polyvinyl alcohol-based resin layer. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture thereof.

<Pressure-Sensitive Adhesive Layer>

A pressure-sensitive adhesive layer may be provided on the polarizer or the one-side-protected polarizing film to form a pressure-sensitive-adhesive-layer-attached polarizing film for use. The pressure-sensitive adhesive layer can be provided on the one side (a) of the polarizer or with the transparent resin layer interposed in the case of the transparent resin layer-attached polarizing film. A separator can be provided on the pressure-sensitive adhesive layer of the pressure-sensitive-adhesive-layer-attached polarizing film.

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties such as cohesiveness and adhesiveness are preferably used. An acryl-based pressure-sensitive adhesive is preferably used because it has such properties.

As a method of forming the pressure-sensitive adhesive layer, for example, there is exemplified a method in which the pressure-sensitive adhesive is applied to a release-treated separator or the like and the polymerization solvent or the like is removed by drying to form a pressure-sensitive adhesive layer, which is transferred, or a method in which the pressure-sensitive adhesive is directly applied and the polymerization solvent or the like is removed by drying to form a pressure-sensitive adhesive layer on the polarizer or the transparent resin layer. In applying the pressure-sensitive adhesive, one or more solvents other than the polymerization solvent may be newly added as appropriate.

A silicone release liner is preferably used as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

The thickness of the pressure-sensitive adhesive layer is typically, but not limited to, about 1 to about 100 µm, preferably 2 to 50 µm, more preferably 2 to 40 µm, even more preferably 5 to 35 µm.

When the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 µm, preferably about 5 to about 100 µm. If necessary, the separator may be subjected to a release treatment and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment such as a silicone treatment, a long-chain alkyl treatment, or a fluorine treatment, the releasability from the pressure-sensitive adhesive layer can be further improved.

<Surface Protective Film>

A surface protective film may be provided on the polarizer or the one-side-protected polarizing film. The surface protective film generally has a base film and a pressure-sensitive adhesive layer. The surface protective film protects the polarizer with the pressure-sensitive adhesive layer interposed between them.

In view of the ability to be tested or managed, an isotropic or nearly-isotropic film material should be selected as the base film for the surface protective film. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. In particular, polyester-based resins are preferred. The base film may be made of a single film material or a laminate of two or more film materials. The base film may also be a product obtained by stretching the film. The base film generally has a thickness of 500 µm or less, preferably 10 to 200 µm.

The pressure-sensitive adhesive used to form the pressure-sensitive adhesive layer for the surface protective film may be appropriately selected from pressure-sensitive adhesives including, as a base polymer, a (meth)acryl-based polymer, a silicone-based polymer, polyester, polyurethane, polyamide, polyether, fluoride-based polymer, rubber-based polymer, or any other polymer. An acrylic pressure-sensitive adhesive containing an acryl-based polymer as a base polymer is preferred in view of transparency, weather resistance, heat resistance, and other properties. The thickness (dry thickness) of the pressure-sensitive adhesive layer is selected depending on the desired adhesive strength. The thickness of the pressure-sensitive adhesive is generally from about 1 to about 100 µm, preferably from 5 to 50 µm.

A silicone, long-chain alkyl, or fluorine treatment with a low-adhesion material may also be performed to form a release treatment layer on the surface of the base film of the surface protective film, opposite to its surface on which the pressure-sensitive adhesive layer is provided.

<Other Optical Layers>

For practical use, the polarizer of the invention or the one-side-protected polarizing film of the invention may be laminated with any other optical layer or layers to form an optical film. As a non-limiting example, such an optical layer or layers may be one or more optical layers that have ever been used to form liquid crystal display devices or other devices, such as a reflector, a transflector, a retardation plate (including a wavelength plate such as a half or quarter wavelength plate), or a viewing angle compensation film. Particularly preferred is a reflective or transflective polarizing film including a laminate of the one-side-protected polarizing film of the invention and a reflector or a transflector, an elliptically or circularly polarizing film including a laminate of the one-side-protected polarizing film of the invention and a retardation plate, a wide viewing angle polarizing film including a laminate of the one-side-protected polarizing film of the invention and a viewing angle compensation film, or a polarizing film including a laminate of the one-side-protected polarizing film of the invention and a brightness enhancement film.

The optical film including a laminate of the above optical layer and the polarizer or the one-side-protected polarizing film may be formed by a method of stacking them one by one, for example, in the process of manufacturing a liquid crystal display device. However, the optical film should be formed by stacking them in advance, which is superior in quality stability or assembling workability and thus advantageous in facilitating the process of manufacturing liquid crystal display devices or other devices. In the lamination, any appropriate bonding means such as a pressure-sensitive adhesive layer may be used. When the one-side-protected polarizing film and any other optical film are bonded together, their optical axes may be each aligned at an appropriate angle, depending on the desired retardation properties or other desired properties.

The polarizer, the one-side-protected polarizing film, or the optical film according to the invention is preferably used to form various image display devices such as liquid crystal display devices and organic EL display devices. Liquid crystal display devices may be formed according to conventional techniques. Specifically, a liquid crystal display device may be typically formed according to any conventional techniques by appropriately assembling a liquid crystal cell, and the polarizer, the one-side-protected polarizing film, or optical films, and optional components such as a lighting system, incorporating a driving circuit, and performing other processes, except that the polarizer, the one-side-protected polarizing film, or the optical film according to the invention is used. The liquid crystal cell to be used may also be of any type, such as IPS type or VA type. The invention is particularly suitable for IPS type.

Any desired liquid crystal display device may be formed, such as a liquid crystal display device including a liquid crystal cell and the polarizer(s), the one-side-protected polarizing film(s), or the optical film(s) placed on one or both sides of the liquid crystal cell, or a liquid crystal display device further including a backlight or a reflector in the lighting system. In such a case, the polarizer(s), the one-side-protected polarizing film(s), or the optical film(s) according to the invention may be placed on one or both sides of the liquid crystal cell. When the polarizers, the one-side-protected polarizing films, or the optical films are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

<Method for Continuously Producing Image Display Device>

The image display device described above is preferably produced by a continuous production method (roll-to-panel process) including the steps of: unwinding the pressure-sensitive-adhesive-layer-attached polarizing film of the invention from a roll thereof; feeding the pressure-sensitive-adhesive-layer-attached polarizing film with the separator; and continuously bonding the pressure-sensitive-adhesive-layer-attached polarizing film to the surface of an image display panel with the pressure-sensitive adhesive layer interposed therebetween. The pressure-sensitive-adhesive-layer-attached polarizing film of the invention is a very thin film. Therefore, if the pressure-sensitive-adhesive-layer-attached polarizing film of the invention is subjected to a process that includes cutting the film into sheet pieces (cut pieces) and then bonding the pieces one by one to image display panels (also referred to as a "sheet-to-panel process"), the sheets will be difficult to feed or handle during the bonding of them to the display panels, so that the risk for the pressure-sensitive-adhesive-layer-attached polarizing films (sheets) to undergo high mechanical shock (such as suction-induced bending) will increase during these processes. In order to reduce the risk, other measures should be taken, such as using a relatively thick surface protective film including a base film with a thickness of 50 μm or more. In contrast, the roll-to-panel process allows the pressure-sensitive-adhesive-layer-attached polarizing film to be stably fed from the roll to the image display panel with the aid of the separator, without cutting the film into sheet pieces (cut pieces), and also allows the film to be directly bonded to the image display panel, which makes it possible to significantly reduce the risk without using a relatively thick surface protective film. As a result, in combination with the ability to alleviate the mechanical shock by the pressure-sensitive adhesive layer controlled so that the film thickness and the storage elastic modulus satisfy the prescribed relational expression, an image display panel in which occurrence of nano-slits is effectively suppressed can be continuously produced at a high speed.

Figure 5:
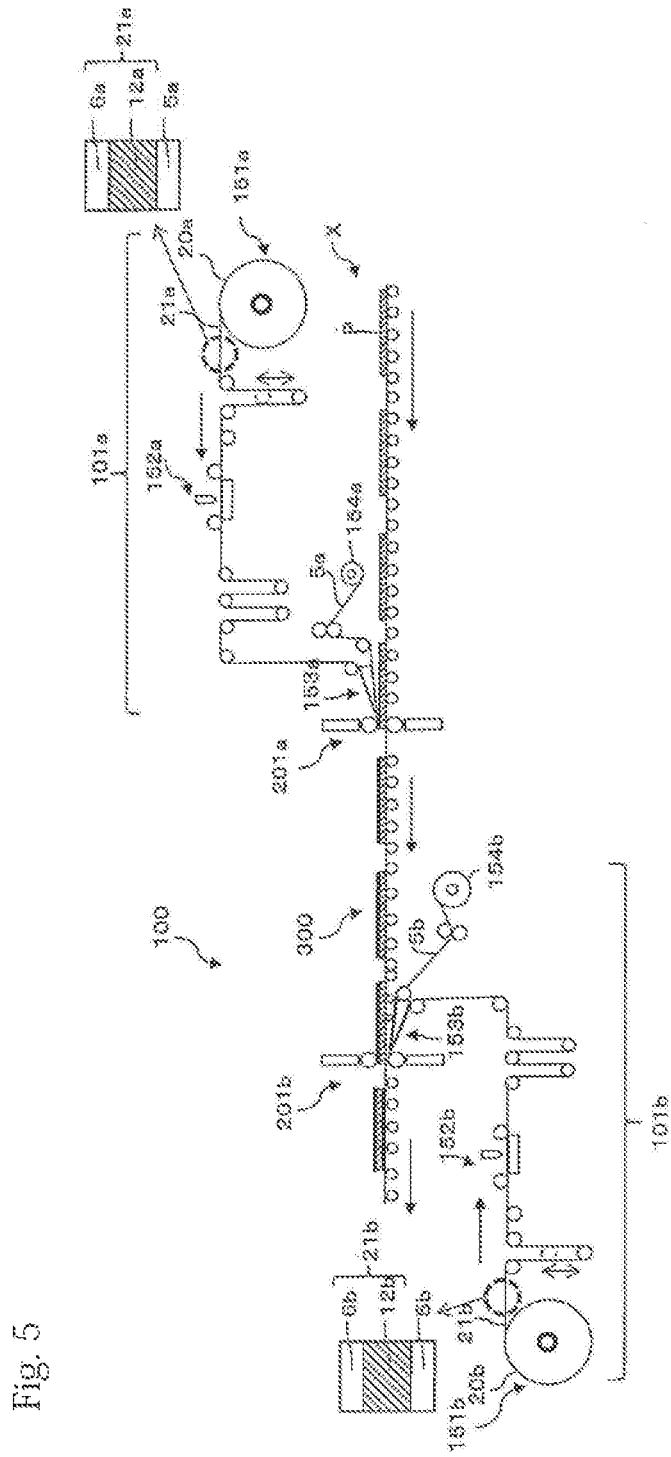
FIG. 5 is a schematic cross-sectional view of an example of a system for continuously producing image display devices.

FIG. 5 is a schematic diagram illustrating an example of a system for continuously producing liquid crystal devices using the roll-to-panel process.

As illustrated in FIG. 5, a system 100 for continuously producing liquid crystal display devices includes a continuous feed unit X configured to feed liquid crystal display panels P, a first polarizing film supply unit 101a, a first bonding unit 201a, a second polarizing film supply unit 101b, and a second bonding unit 201b.

In this case, a roll 20a of a first pressure-sensitive-adhesive-layer-attached polarizing film (a first roll) and a roll 20b of a second pressure-sensitive-adhesive-layer-attached polarizing film (a second roll) are used, in which the films each have an absorption axis in the longitudinal direction and each have the structure shown in FIG. 2A.

(Feed Unit)

The feed unit X is configured to feed liquid crystal display panels P. The feed unit X includes a plurality of feed rollers, suction plates, and other components. The feed unit X includes an orientation changing unit 300 that is provided between the first and second bonding units 201a and 201b and configured to interchange the positional relationship between the long and short sides of the liquid crystal panel P with respect to the direction of the feed of the liquid crystal display panel P (e.g., by horizontally turning the liquid crystal display panel P by 90°). This allows the first and second pressure-sensitive-adhesive-layer-attached polarizing films 21a and 21b to be bonded in a cross-Nicols relationship to the liquid crystal display panel P.

(First Polarizing Film Supply Unit)

The first polarizing film supply unit 101a is configured to unwind the first pressure-sensitive-adhesive-layer-attached polarizing film 21a (with a surface protective film) from the first roll 20a, feed the film 21a with the separator 5a, and continuously supply the film 21a to the first bonding unit 201a. The first polarizing film supply unit 101a includes a first unwinding unit 151a, a first cutting unit 152a, a first peeling unit 153a, a first winding unit 154a, a plurality of feed roller units, an accumulator unit including dancer rolls, and other components.

The first unwinding unit 151a has an unwinding shaft on which the first roll 20a is placed, and is configured to unwind, from the first roll 20a, the long, pressure-sensitive-adhesive-layer-attached, polarizing film 21a provided with the separator 5a.

The first cutting unit 152a includes cutting means such as a cutter or a laser and suction means. The first cutting unit 152a is configured to form a piece with a predetermined length by transversely cutting the first long pressure-sensitive-adhesive-layer-attached polarizing film 21a and leaving the separator 5a uncut. Alternatively, the first roll 20a may be a roll of a laminate of the separator 5a and the long pressure-sensitive-adhesive-layer-attached polarizing film with a plurality of score lines formed in the widthwise direction at predetermined intervals (a scored optical film roll). In this case, the first cutting unit 152a is unnecessary (this also applies to the second cutting unit 152b described below).

The first peeling unit 153a is configured to peel off the first pressure-sensitive-adhesive-layer-attached polarizing film 21a from the separator 5a by inwardly folding back the separator 5a. The first peeling unit 153a may include a wedge-shaped member, rollers, and other components.

The first winding unit 154a is configured to wind the separator 5a from which the first pressure-sensitive-adhesive-layer-attached polarizing film 21a has been peeled off. The first winding unit 154a has a winding shaft on which a roll for winding the separator 5a is placed.

(First Bonding Unit)

The first bonding unit 201a is configured to continuously bond the first pressure-sensitive-adhesive-layer-attached polarizing film 21a, which has been peeled off by the first peeling unit 153a, to the liquid crystal display panel P, which is being fed by the feed unit X, with the pressure-sensitive adhesive layer of the first pressure-sensitive-adhesive-layer-attached polarizing film 21a interposed therebetween (first bonding step). The first bonding unit 81 includes a pair of bonding rollers, at least one of which includes a drive roller.

(Second Polarizing Film Supply Unit)

The second polarizing film supply unit 101b is configured to unwind the second pressure-sensitive-adhesive-layer-attached polarizing film 21b (with a surface protective film) from the second roll 20b, feed the film 21b with the separator 5b, and continuously supply the film 21b to the second bonding unit 201b. The second polarizing film supply unit 101b includes a second unwinding unit 151b, a second cutting unit 152b, a second peeling unit 153b, a second winding unit 154b, a plurality of feed roller units, an accumulator unit including dancer rolls, and other components. The second unwinding unit 151b, the second cutting unit 152b, the second peeling unit 153b, and the second winding unit 154b have the same structures and functions as those of the first unwinding unit 151a, the first cutting unit 152a, the first peeling unit 153a, and the first winding unit 154a, respectively.

(Second Bonding Unit)

The second bonding unit 201b is configured to continuously bond the second pressure-sensitive-adhesive-layer-attached polarizing film 21b, which has been peeled off by the second peeling unit 153b, to the liquid crystal display panel P, which is being fed by the feed unit X, with the pressure-sensitive adhesive layer of the second pressure-sensitive-adhesive-layer-attached polarizing film 21b interposed therebetween (second bonding step). The second bonding unit 201b includes a pair of bonding rollers, at least one of which includes a drive roller.

EXAMPLES

Hereinafter, the invention will be more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

Example 1

<Preparation of Polarizer A0: Embodiment of FIG. 1B>

A corona treatment was performed on one surface of an amorphous isophthalic acid-copolymerized polyethylene terephthalate (IPA-copolymerized PET) film substrate (100 μm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizer to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by weight of water) at a temperature of 30° C. (crosslinking).

The laminate was then uniaxially stretched to a total stretch ratio of 5.5 times in the longitudinal direction between rolls at different peripheral speeds while it was immersed in an aqueous boric acid solution (an solution obtained by adding 4 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 15° C. (cleaning) for 3 seconds.

The resulting product was an optical film laminate A0 including a 5-μm-thick polarizer. The optical characteristics of the obtained optical film laminate A0 were as follows: the transmittance was 42.8%, and the polarization degree was 99.99%. The optical film laminate A0 was used as a one-side-protected polarizing film.

Example 2

<Preparation of Polarizer A1>

A polarizer A1 was obtained in the same manner as in the method for preparing the optical film laminate A0, except that in the preparation of the optical film laminate A0, the content of the boric acid mixed with the aqueous boric acid solution in the stretching treatment in water was changed to 3.75 parts by weight. The obtained polarizer had a thickness of 5 µm. The optical characteristics of the optical film laminate A1 thus obtained were as follows: the transmittance was 42.8% and the polarization degree was 99.99%.

Example 3

<Preparation of Polarizer A2>

A polarizer A2 was obtained in the same manner as in the method for preparing the optical film laminate A0, except that in the preparation of the optical film laminate A0, a PVA-based resin layer having a thickness of 16 µm was formed to produce a laminate, and that the content of the boric acid mixed with the aqueous boric acid solution in the stretching treatment in water was changed to 3.75 parts by weight. The obtained polarizer had a thickness of 7 µm. The optical characteristics of the optical film laminate A2 thus obtained were as follows: the transmittance was 42.8% and the polarization degree was 99.99%.

Example 4

<Preparation of Polarizer A3>

A polarizer A3 was obtained in the same manner as in the method for preparing the optical film laminate A0, except that in the preparation of the optical film laminate A0, the content of the boric acid mixed with the aqueous boric acid solution in the stretching treatment in water was changed to 3.00 parts by weight. The obtained polarizer had a thickness of 5 µm. The optical characteristics of the optical film laminate A3 thus obtained were as follows: the transmittance was 42.8% and the polarization degree was 99.99%.

Example 5

<Polyvinyl Alcohol-Based Forming Material A>

Boric acid (15 parts by weight) was blended with 100 parts by weight of a polyvinyl alcohol resin having a polymerization degree of 2500 and a saponification degree of 99.0 mol % and then dissolved in pure water to prepare an aqueous solution having a solid content concentration of 4% by weight.

<Preparation of One-Side-Protected Polarizing Film: Embodiment of FIG. 2B>

On the surface of the polarizer of the optical film laminate A0 (polarizer surface not provided with a resin substrate), the polyvinyl alcohol-based forming material A adjusted to 25° C. was applied with a wire bar coater so as to have a thickness of 0.5 µm after drying, and then dried with hot air at 80° C. for 30 seconds to forma transparent resin layer, thereby to prepare a one-side-protected polarizing film.

Examples 6 and 7

A transparent resin layer was formed in the same manner as in Example 5 except that the thickness of the transparent resin layer in Example 5 was changed as shown in Table 1, thereby to prepare a one-side-protected polarizing film.

Example 8

<Polyvinyl Alcohol-Based Forming Material B>

A polyvinyl alcohol resin having a polymerization degree of 2500 and a saponification degree of 99.0 mol % was dissolved in pure water to prepare an aqueous solution having a solid content concentration of 4% by weight.

<Preparation of One-Side-Protected Polarizing Film: Embodiment of FIG. 2B>

On the surface of the polarizer of the optical film laminate A0 (polarizer surface not provided with a resin substrate), the polyvinyl alcohol-based forming material B adjusted to 25° C. was applied with a wire bar coater so as to have a thickness of 0.5 µm after drying, and then dried with hot air at 80° C. for 30 seconds to forma transparent resin layer, thereby to prepare a one-side-protected polarizing film.

Examples 9 and 10

A transparent resin layer was formed in the same manner as in Example 8 except that the thickness of the transparent resin layer in Example 8 was changed as shown in Table 1, thereby to prepare a one-side-protected polarizing film.

Comparative Example 1

<Preparation of Polarizer A4>

A polarizer A4 was obtained in the same manner as in the method for preparing the optical film laminate A0, except that in the preparation of the optical film laminate A0, the content of the boric acid mixed with an aqueous boric acid solution in the stretching treatment in water was changed to 4.00 parts by weight, and that the immersion time in the washing treatment was changed to 6 seconds. The obtained polarizer had a thickness of 5 µm. The optical characteristics of the optical film laminate A4 thus obtained were as follows: the transmittance was 42.8% and the polarization degree was 99.99%.

Comparative Example 2

<Preparation of Polarizer A5>

A polarizer A5 was obtained in the same manner as in the method for preparing the optical film laminate A0, except that in the preparation of the optical film laminate A0, the content of the boric acid mixed with an aqueous boric acid solution in the stretching treatment in water was changed to 4.25 parts by weight, and that the immersion time in the washing treatment was changed to 6 seconds. The obtained polarizer had a thickness of 5 µm. The optical characteristics of the optical film laminate A5 thus obtained were as follows: the transmittance was 42.8% and the polarization degree was 99.99%.

Comparative Example 3

<Preparation of Polarizer A6>

A polarizer A6 was obtained in the same manner as in the method for preparing the optical film laminate A0, except that in the preparation of the optical film laminate A0, the content of the boric acid mixed with an aqueous boric acid solution in the stretching treatment in water was changed to 4.00 parts by weight, and that the immersion time in the washing treatment was changed to 6 seconds. The obtained polarizer had a thickness of 5 μm. The optical characteristics of the optical film laminate A6 thus obtained were as follows: the transmittance was 42.8% and the polarization degree was 99.99%.

<Polyvinyl Alcohol-Based Forming Material C>

Boric acid (25 parts by weight) was blended with 100 parts by weight of a polyvinyl alcohol resin having a polymerization degree of 2500 and a saponification degree of 99.0 mol % and then dissolved in pure water to prepare an aqueous solution having a solid content concentration of 4% by weight.

<Preparation of One-Side-Protected Polarizing Film: Embodiment of FIG. 2B>

On the surface of the polarizer of the optical film laminate A6 (polarizer surface not provided with a resin substrate), the polyvinyl alcohol-based forming material C adjusted to 25° C. was applied with a wire bar coater so as to have a thickness of 1.0 μm after drying, and then dried with hot air at 80° C. for 30 seconds to forma transparent resin layer, thereby to prepare a one-side-protected polarizing film.

Comparative Example 4

<Preparation of Polarizer A7>

A polarizer A7 was obtained in the same manner as in the method for preparing the optical film laminate A0, except that in the preparation of the optical film laminate A0, the content of the boric acid mixed with an aqueous boric acid solution in the stretching treatment in water was changed to 2.00 parts by weight. The obtained polarizer had a thickness of 5 μm. The optical characteristics of the optical film laminate A7 thus obtained were as follows: the transmittance was 42.3% and the polarization degree was 99.99%.

Comparative Example 5

<Preparation of Polarizer B>

A 30-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer B. The obtained polarizer had a thickness of 12 μm.

<Preparation of Protective Film>

Protective film: Corona treatment was applied to the surface treated for easy adhesion of a (meth)acrylic resin film having a lactone ring structure with a thickness of 40 μm and then the film was used.

<Preparation of Adhesive to be Applied to Protective Film>

40 parts by weight of N-hydroxyethyl acrylamide (HEAA), 60 parts by weight of acryloyl morpholine (ACMO) and 3 parts by weight of a photoinitiator "IRGACURE 819" (manufactured by BASF) were mixed to prepare an ultraviolet curable adhesive.

<Preparation of One-Side-Protected Polarizing Film>

The protective film was bonded to one side surface of the polarizer B while applying the ultraviolet curable adhesive in such a manner as to form a 0.5 μm-thick adhesive layer after curing. Subsequently, the adhesive was cured by applying active energy rays to obtain a one-side-protected polarizing film. As the active energy rays, ultraviolet rays were applied to cure the adhesive. The ultraviolet rays were applied under the following conditions: gallium-containing metal halide lamp; irradiator, Light Hammer 10 manufactured by Fusion UV Systems, Inc; valve, V valve; peak illuminance, 1,600 mW/cm$^2$; total dose, 1,000/mJ/cm$^2$ (wavelength 380-440 nm). The illuminance of the ultraviolet rays was measured with Sola-Check System manufactured by Solatell Ltd. The optical characteristics of the obtained one-side-protected polarizing film were as follows: transmittance 42.8% and polarization degree 99.99%.

Comparative Example 6

<Preparation of Polarizer C>

A 75-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer C. The obtained polarizer had a thickness of 23 μm.

<Preparation of One-Side-Protected Polarizing Film>

A one-side-protected polarizing film was prepared in the same manner as in Comparative Example 5, except that the polarizer C was used in place of the polarizer B in Comparative Example 5. The optical characteristics of the obtained one-side-protected polarizing film were as follows: transmittance 42.5% and polarization degree 99.99%.

<<Production of Pressure-Sensitive-Adhesive-Layer-Attached Polarizing Film: Embodiment of FIGS. 1C and 2C>>

<Preparation of Acryl-Based Polymer>

A monomer mixture containing 99 parts of butyl acrylate and 1 part of 4-hydroxybutyl acrylate was charged into a four-necked flask equipped with a stirring blade, a thermometer, a nitrogen gas inlet tube, and a condenser. Further, 0.1 parts of 2,2'-azobisisobutyronitrile as a polymerization initiator was charged into 100 parts of the monomer mixture (solid content) together with ethyl acetate, and nitrogen gas was introduced to the flask while gently stirring for nitrogen substitution. Then, the polymerization reaction was carried out for 7 hours while keeping the liquid temperature in the flask at around 60° C. Thereafter, ethyl acetate was added to the obtained reaction solution to prepare a solution of an acryl-based polymer having a weight average molecular weight of 1,400,000 which was adjusted to have a solid content concentration of 30%.

<Preparation of Pressure-Sensitive Adhesive Composition>

Trimethylolpropane xylylene diisocyanate (0.1 parts) (Takenate D110N, manufactured by Mitsui Chemicals, Inc.), 0.3 parts of dibenzoyl peroxide, and 0.075 parts of γ-glycidoxypropyl methoxysilane (KBM-403, manufactured by Shin-Etsu Chemical Co., Ltd.) were blended with respect to 100 parts of the acryl-based polymer solution to prepare an acryl-based pressure-sensitive adhesive solution.

<Formation of Pressure-Sensitive Adhesive Layer>

Subsequently, the acryl-based pressure-sensitive adhesive solution was uniformly applied with a fountain coater to the surface of a polyethylene terephthalate film (separator film) which had been treated with a silicone-based release agent and then the film was dried in an air circulation type thermostatic oven at 155° C. for 2 minutes to form a pressure-sensitive adhesive layer having a thickness of 20 µm on the surface of the separator film.

On the surface of a polarizer (a polarizer surface not provided with a resin substrate) or a transparent resin layer of the one-side-protected polarizing film (including an optical film laminate) obtained in the Examples or Comparative Examples, the pressure-sensitive adhesive layer formed on the release treated surface of the release sheet (separator) was bonded to prepare a pressure-sensitive-adhesive-layer-attached polarizing film.

The one-side-protected polarizing film or the pressure-sensitive-adhesive-layer-attached polarizing film obtained in Examples and Comparative Examples mentioned above was evaluated as follows. The results are shown in Table 1.

<Single-Body Transmittance T and Polarization Degree P of Polarizer>

The single-body transmittance T and polarization degree P of the resulting one-side-protected polarizing films were measured using an integrating sphere-equipped spectral transmittance meter (DOT-3C manufactured by Murakami Color Research Laboratory Co., Ltd.).

The polarization degree P is calculated from the formula below using the transmittance (parallel transmittance Tp) of a laminate of the same two one-side-protected polarizing films with their transmission axes parallel to each other and the transmittance (crossed transmittance Tc) of a laminate of the same two polarizing films with their transmission axes orthogonal to each other.

Polarization degree $P(\%)=\{(Tp-Tc)/(Tp+Tc)\}^{1/2}\times100$

Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

<Measurement of the Content of Boric Acid in Polarizer>

The polarizers obtained in the examples and the comparative examples were subjected to attenuated total reflection (ATR) spectroscopy using polarized light as the measurement light and using a Fourier transform infrared spectrometer (FTIR) (Spectrum 2000 (trade name) manufactured by PerkinElmer, Inc.), in which the boric acid peak (665 $cm^{-1}$) intensity and the reference peak (2,941 $cm^{-1}$) intensity were measured. The boric acid amount index was calculated from the formula below using the resulting boric acid peak intensity and reference peak intensity, and then the boric acid content (% by weight) was determined from the formula below using the calculated boric acid amount index.

(Boric acid amount index)=(the intensity of the boric acid peak at 665 $cm^{-1}$)/(the intensity of the reference peak at 2,941 $cm^{-1}$)

(Boric acid content(% by weight))=(boric acid amount index)×5.54+4.1

The measurement of the boric acid content (a) in the polarizer was carried out by directly measuring the polarizer surface of the one-side-protected polarizing film (or optical film laminate) using the above apparatus. In the case of a transparent resin layer-attached polarizer, the measurement of the boric acid content was performed from the transparent resin layer surface.

On the other hand, using the above apparatus, the boric acid content (b) was measured by directly measuring the surface formed by peeling the protective film (or resin substrate) from the obtained pressure-sensitive-adhesive-layer-attached polarizing film.

<Suppression of the Occurrence of Nano-Slits: Guitar Pick Test>

A piece with a size of 50 mm×150 mm (50 mm in the absorption axis direction) was cut from the resulting pressure-sensitive-adhesive-layer-attached polarizing film. The resulting piece was called sample 12. When sample 12 used, surface protective film 6 prepared by the method described below was bonded to the protective film 3 side of sample 12.

(Surface Protective Film for Test)

A backing-forming material of low-density polyethylene with a melt flow rate of 2.0 g/10 min at 190° C. and a density of 0.924 $g/cm^3$ was supplied to an inflation molding machine for co-extrusion.

At the same time, a pressure-sensitive adhesive-forming material of a propylene-butene copolymer (propylene:butene=85:15 in weight ratio, atactic structure) with a melt flow rate of 10.0 g/10 min at 230° C. and a density of 0.86 $g/cm^3$ was supplied to the inflation molding machine with a die temperature of 220° C. and subjected to co-extrusion. A surface protective film composed of a 33-µm-thick backing layer and a 5-µm-thick pressure-sensitive adhesive layer was produced in this way.

Figure 4A:
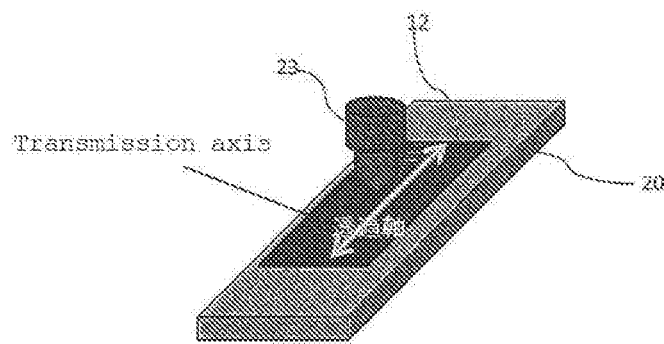
FIGS. 4A and 4B are schematic views illustrating items to be evaluated for nano-slits in examples and comparative examples.
Figure 4B:
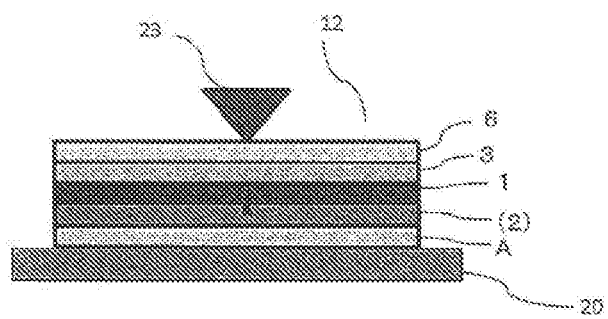

Next, as shown in the conceptual view of FIG. 4A and the cross-sectional view of FIG. 4B, the release sheet (separator) was peeled off from the sample, and the sample was pasted on a glass plate 20 via an exposed pressure-sensitive adhesive layer A. Subsequently, a load of 200 g was applied using a guitar pick (Model No. HP2H (HARD) manufactured by HISTORY, Inc.) to the center of sample 12 (surface protective film 6 side), and the applied load was reciprocated 50 times within a distance of 100 mm in the direction perpendicular to the absorption axis of polarizer 1 of sample 12. The load was applied to one portion.

Subsequently, after sample 12 was allowed to stand in an environment at 80° C. for 1 hour, it was evaluated whether light leakage cracks occurred in sample 12, based on the following criteria.

A: 100 or less cracks or no crack
B: 101 to 500 cracks
C: 501 to 1000 cracks
D: 1001 or more cracks <Observation of Through Cracks (Heat Shock Test)>

A piece of 50 mm×150 mm (50 mm in the absorption axis direction) and a piece of 150 mm×50 mm (150 mm in the absorption axis direction) were cut from each resulting pressure-sensitive-adhesive-layer-attached polarizing film. The cut pieces were bonded in the directions of crossed Nicols to both sides a 0.5-mm-thick non-alkali glass sheet to form a sample. The sample was exposed to the environment of 100 cycles of heat shock from −40 to 85° C. each for 30 minutes. Subsequently, the sample was taken out and visually observed for the presence or absence of through cracks (and the number of through cracks) in the pressure-sensitive-adhesive-layer-attached polarizing film. This test was performed five times. The evaluation was performed according to the following.

○: No through crack is observed.
x: A through crack or cracks are observed.

<Moist Heat Resistance: Change Rate in Polarization Degree (Optical Reliability Test)>

The obtained one-side-protected polarizing film was cut into a size of 25 mm×50 mm (50 mm in the absorption axis direction). The one-side-protected polarizing film (sample) was introduced in a thermo-hygrostat at 85° C./85% RH for 150 hours. The polarization degree of the one-side-protected polarizing film sample was measured before and after the introduction using an integrating sphere-equipped spectral transmittance meter (Dot-3c, manufactured by Murakami Color Research Laboratory Co., Ltd.), and the change rate (%) in polarization degree was determined by the following formula:

Change rate(%) in polarization degree=(1×(polarization degree after introduction)/(polarization degree before introduction)).

The polarization degree P is calculated from the formula below using the transmittance (parallel transmittance Tp) of a laminate of the same two one-side-protected polarizing films with their transmission axes parallel to each other and the transmittance (crossed transmittance Tc) of a laminate of the same two one-side-protected polarizing films with their transmission axes orthogonal to each other:

Polarization degree $P(\%) = \{(Tp-Tc)/(Tp+Tc)\}^{1/2} \times 100$.

Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

In Table 1, the change rate of polarization degree is described, and the change rate was judged based on the following criteria.

○: Change rate of polarization degree is 0.5% or less.
Δ: Change rate of polarization degree is more than 0.5% and 5.0% or less.
x: Change rate of polarization degree is more than 5.0%.

<Transportability>

The transportability was evaluated according to the following criteria by visual observation of the possibility of transfer of the one-side-protected polarizing film and the state of scratches on the surface of the polarizer in the obtained one-side-protected polarizing film at the time of producing the one-side-protected polarizing film (or optical film laminate).

○: The one-side-protected polarizing film can be transported, and there is no scratch on the surface of the polarizer.
Δ: The one-side-protected polarizing film can be transported, and there is no remarkable scratch on the surface of the polarizer.
x: The one-side-protected polarizing film cannot be transported.

TABLE 1

| | | | | Polarizer | | | | Transparent resin layer | | | | |
| | | | | | Boric acid content (% By Weight) | | | | | PVA-based resin | | |
| | Type | Thickness (μm) | Single body transmittance T (%) | Polarization degree P (%) | Boric acid content (a) on the pressure-sensitive adhesive layer side | Boric acid content (b) on the other side | (b) − (a) | Thickness (μm) | Type | Saponification degree | Polymerization degree | Boric acid |
|---|---|---|---|---|---|---|---|---|---|---|---|---|
| Example 1 | A0 | 5 μm | 42.8 | 99.99 | 17.7 | 18.4 | 0.7 | | | None | | |
| Example 2 | A1 | 5 μm | 42.8 | 99.99 | 16.2 | 16.8 | 0.6 | | | None | | |
| Example 3 | A2 | 7 μm | 42.8 | 99.99 | 16.2 | 16.7 | 0.5 | | | None | | |
| Example 4 | A3 | 5 μm | 42.8 | 99.99 | 13.2 | 13.8 | 0.6 | | | None | | |
| Example 5 | A0 | 5 μm | 42.8 | 99.99 | 16.3 | 17.6 | 1.3 | 0.5 μm | A | 99.0% | 2500 | Yes |
| Example 6 | A0 | 5 μm | 42.8 | 99.99 | 15.5 | 17.6 | 2.1 | 1.0 μm | A | 99.0% | 2500 | Yes |
| Example 7 | A0 | 5 μm | 42.8 | 99.99 | 14.3 | 17.6 | 3.3 | 3.0 μm | A | 99.0% | 2500 | Yes |
| Example 8 | A0 | 5 μm | 42.8 | 99.99 | 8.3 | 17.6 | 9.3 | 0.5 μm | B | 99.0% | 2500 | None |
| Example 9 | A0 | 5 μm | 42.8 | 99.99 | 6.7 | 17.6 | 10.9 | 1.0 μm | B | 99.0% | 2500 | None |
| Example 10 | A0 | 5 μm | 42.8 | 99.99 | 2.2 | 17.6 | 15.4 | 3.0 μm | B | 99.0% | 2500 | None |
| Comparative example 1 | A4 | 5 μm | 42.8 | 99.99 | 18.2 | 17.8 | −0.4 | | | None | | |
| Comparative example 2 | A5 | 5 μm | 42.8 | 99.99 | 19.3 | 18.7 | −0.6 | | | None | | |
| Comparative example 3 | A6 | 5 μm | 42.8 | 99.99 | 22.1 | 18.4 | −3.7 | 1.0 μm | C | 99.0% | 2500 | None |
| Comparative example 4 | A7 | 5 μm | — | — | 12.1 | 10.8 | −1.3 | | | None | | |
| Comparative example 5 | B | 12 μm | 42.8 | 99.99 | 23.6 | 23.3 | −0.3 | | | None | | |
| Comparative example 6 | C | 23 μm | 42.5 | 99.99 | 22.1 | 21.6 | −0.5 | | | None | | |

| | Evaluation | | | | |
| | Crack test | | Optical reliability (moisture resistance) | | |
| | Suppression of occurrence of nano-slits | Suppression of occurrence of through cracks | Change in polarization degree (%) | Evaluation | Transportability |
|---|---|---|---|---|---|
| Example 1 | B | ○ | 0.02 | ○ | ○ |
| Example 2 | B | ○ | 0.02 | ○ | ○ |
| Example 3 | B | ○ | 0.1 | ○ | ○ |
| Example 4 | B | ○ | 0.02 | ○ | Δ |

TABLE 1-continued

| | | | | | |
|---|---|---|---|---|---|
| Example 5 | B | ○ | 0.02 | ○ | ○ |
| Example 6 | B | ○ | 0.03 | ○ | ○ |
| Example 7 | A | ○ | 0.32 | ○ | ○ |
| Example 8 | A | ○ | 0.02 | ○ | ○ |
| Example 9 | A | ○ | 0.06 | ○ | ○ |
| Example 10 | A | ○ | 0.68 | Δ | ○ |
| Comparative example 1 | C | ○ | 0.04 | ○ | ○ |
| Comparative example 2 | D | ○ | 0.02 | ○ | ○ |
| Comparative example 3 | D | ○ | 0.03 | ○ | ○ |
| Comparative example 4 | — | — | — | — | x |
| Comparative example 5 | D | x | 0.12 | ○ | ○ |
| Comparative example 6 | D | x | 0.73 | Δ | ○ |

Example 11

This Example is similar to Example 10, except that one-side-protected polarizing film was used in the form of a long strip, the forming material was applied using a micro gravure coater, and the release sheet (separator) described above and the surface protective film described below were used in the form of long strips. As a result, rolls of a pressure-sensitive-adhesive-layer-attached one-side-protected polarizing film (embodiment of FIG. 2D), wherein a separator placed on the polarizer side of the one-side-protected polarizing film and the surface protective film placed on the transparent protective film side were laminated, were prepared. A set of rolls of the pressure-sensitive-adhesive-layer-attached one-side-protected polarizing film were provided having widths corresponding to the short and long sides of a 32-inch non-alkali glass sheet, respectively, in order to be subjected to slit processing, in which the pressure-sensitive-adhesive-layer-attached one-side-protected polarizing film was cut into pieces while being fed continuously.

(Surface Protective Film for Roll-to-Panel Process)

A surface protective film was obtained by applying an acrylic pressure-sensitive adhesive with a thickness of 15 μm to the surface of an antistatic treatment layer-attached polyethylene terephthalate film (Diafoil T100G38 (trade name) manufactured by Mitsubishi Plastics, Inc., 38 μm in thickness) opposite to its antistatically treated surface.

Using a continuous production system for the roll-to-panel process shown in FIG. 5, the pressure-sensitive-adhesive-layer-attached one-side-protected polarizing films were continuously supplied from the set of rolls, and the pressure-sensitive-adhesive-layer-attached one-side-protected polarizing films were continuously bonded in a cross-Nicols relationship to both sides of each of 100 sheets of 0.5-mm-thick 32-inch non-alkali glass.

<Observation of Occurrence of Nano-Slits (Heating Test)>

A hundred sheets of non-alkali glass each provided with the pressure-sensitive-adhesive-layer-attached one-side-protected polarizing films bonded to both sides were placed in an oven at 80° C. for 24 hours and then visually observed for the presence or absence of nano-slits. No nano-slit-induced defect (light leakage) was observed.

DESCRIPTION OF REFERENCE SIGNS

1 Polarizer
2 Transparent resin layer
3 Resin substrate
4 Protective film
A Pressure-sensitive adhesive layer
10 Transparent resin layer-attached polarizer
11 One-side-protected polarizing film
12 Pressure-sensitive-adhesive-layer-attached polarizing film
a One side of the pressure-sensitive adhesive layer side of the polarizer
b Other side of the pressure-sensitive adhesive layer side of the polarizer
5, 5a, 5b Separator
6, 6a, 6b Surface protective film
10 Polarizing film
11 Pressure-sensitive-adhesive-layer-attached polarizing film
20a, 20b Roll of pressure-sensitive-adhesive-layer-attached polarizing film (roll)
21a, 21b Pressure-sensitive-adhesive-layer-attached polarizing film (with surface protective film)
100 System for continuously producing image display devices
101a, 101b Polarizing film supply unit
151a, 151b Unwinding unit
152a, 152b Cutting unit
153a, 153b Peeling unit
154a, 154b Winding unit
201a, 201b Bonding unit
300 Orientation changing unit
P Image display panel
X Image display panel feed unit

The invention claimed is:

1. A polarizer used for a pressure-sensitive-adhesive-layer-attached polarizing film having a pressure-sensitive adhesive layer on one side of the polarizer, comprising:
boric acid and a polyvinyl alcohol-based resin,
wherein the polarizer has a thickness of 10 μm or less, and
wherein the polarizer has an optical property satisfying a condition represented by an expression:
$P > -(10^{0.929T-42.4}-1) \times 100$ (when $T<42.3$) or $P \geq 99.9$ (when $T \geq 42.3$),
wherein T represents a single-body transmittance and P represents a polarization degree,
wherein a boric acid content (a) measured from one side of the polarizer, the one side to be provided with the pressure-sensitive adhesive layer, is less than a boric acid content (b) measured from the other side, and
wherein a difference between the boric acid content (a) and the boric acid content (b) is 0.5% by weight or more.

2. The polarizer according to claim 1, wherein a difference between the boric acid content (a) and the boric acid content (b) is 3% by weight or more.

3. The polarizer according to claim 1, wherein the boric acid content (b) is 20% by weight or less.

4. The polarizer according to claim 1, wherein a transparent resin layer which is a formed product of a forming material containing a polyvinyl alcohol-based resin is provided on the one side of the polarizer to be provided with the pressure-sensitive adhesive layer.

5. The polarizer according to claim 4, wherein the transparent resin layer has a thickness of 0.2 μm or more.

6. The polarizer according to claim 4, wherein the transparent resin layer has a thickness of 6 μm or less.

7. The polarizer according to claim 4, wherein the polyvinyl alcohol-based resin forming the transparent resin layer has a saponification degree of 99 mol % or more and an average polymerization degree of 2000 or more.

8. A one-side-protected polarizing film comprising the polarizer according to claim 1 and a protective film only on the other side of the polarizer opposite to the side to be provided with the pressure-sensitive adhesive layer.

9. A method for producing a polarizer having a transparent resin layer which is a formed product of a forming material containing a polyvinyl alcohol-based resin on one side of the polarizer according to claim 4, the one side to be provided with the pressure-sensitive adhesive layer, the method comprising:
applying the transparent resin layer forming material directly on the one side of the polarizer to be provided with the pressure-sensitive adhesive layer,
wherein the polarizer is configured to contain boric acid and a polyvinyl alcohol-based resin, to have a thickness of 10 μm or less, and to have an optical property satisfying the condition represented by the expression: $P > -(10^{0.929T-42.4}-1) \times 100$ (when $T<42.3$) or $P \geq 99.9$ (when $T \geq 42.3$), wherein T represents the single-body transmittance and P represents the polarization degree, and the boric acid content (a) measured from the one side of the polarizer to be provided with the pressure-sensitive adhesive layer is less than the boric acid content (b) measured from the other side.

10. A method for producing the one-side-protected polarizing film according to claim 8, having a transparent resin layer which is a formed product of a forming material containing a polyvinyl alcohol-based resin, on one side of the polarizer, the one side to be provided with the pressure-sensitive adhesive layer, the method comprising:
applying the transparent resin layer forming material directly on the one side of the polarizer to be provided with the pressure-sensitive adhesive layer,
wherein the polarizer is configured to contain boric acid and a polyvinyl alcohol-based resin, to have a thickness of 10 μm or less, and to have an optical property satisfying the condition represented by the expression: $P > -(10^{0.929T-42.4}-1) \times 100$ (when $T<42.3$) or $P \geq 99.9$ (when $T \geq 42.3$) wherein T represents the single-body transmittance and P represents the polarization degree, and wherein the boric acid content (a) measured from the one side of the polarizer to be provided with the pressure-sensitive adhesive layer is less than the boric acid content (b) measured from the other side.

11. A pressure-sensitive-adhesive-layer-attached polarizing film having the polarizer according to claim 1, and a pressure-sensitive adhesive layer on one side of the polarizer, the one side to be provided with a pressure-sensitive adhesive layer.

12. The pressure-sensitive-adhesive-layer-attached polarizing film according to claim 11, further comprising a separator provided on the pressure-sensitive adhesive layer.

13. The pressure-sensitive-adhesive-layer-attached polarizing film according to claim 12, which is in the form of a roll.

14. An image display device comprising the polarizer according to claim 1.

15. A method for continuously producing an image display device, the method comprising the steps of:
unwinding the pressure-sensitive-adhesive-layer-attached polarizing film from the roll of the pressure-sensitive-adhesive-layer-attached polarizing film according to claim 11;
feeding the pressure-sensitive-adhesive-layer-attached polarizing film with the separator; and
continuously bonding the pressure-sensitive-adhesive-layer-attached polarizing film to a surface of an image display panel with the pressure-sensitive adhesive layer interposed therebetween.

16. A pressure-sensitive-adhesive-layer-attached polarizing film having the one-side-protected polarizing film according to claim 8, and a pressure-sensitive adhesive layer on one side of the one-side-protected polarizing film, the one side to be provided with a pressure-sensitive adhesive layer.

17. An image display device comprising the one-side-protected polarizing film according to claim 8.

18. An image display device comprising the pressure-sensitive-adhesive-layer-attached polarizing film according to claim 11.

* * * * *